United States Patent [19]
Sento et al.

[11] 4,250,424
[45] Feb. 10, 1981

[54] ROTOR OF SYNCHRONOUS MACHINES

[75] Inventors: Hiroshi Sento; Shoji Tanabe; Tadao Shimozu, all of Sakura; Seiji Yamashita, Katsuta; Kunio Miyashita, Hitachi, all of Japan

[73] Assignee: Hitachi, Ltd., Japan

[21] Appl. No.: 946,018

[22] Filed: Sep. 26, 1978

[30] Foreign Application Priority Data

Jan. 11, 1978 [JP] Japan .................................. 53/1170

[51] Int. Cl.³ ............................................. H02K 1/22
[52] U.S. Cl. .................................... 310/261; 310/42; 310/156; 310/217
[58] Field of Search ............... 310/195, 183, 197, 181, 310/182, 162, 163, 211, 217, 156, 261, 216, 264, 265, 42

[56] References Cited

U.S. PATENT DOCUMENTS

| | | | |
|---|---|---|---|
| 2,519,895 | 8/1950 | Edwards | 310/211 |
| 2,525,456 | 10/1950 | Merrill | 310/211 |
| 2,927,229 | 3/1960 | Merrill | 310/211 |
| 3,012,161 | 12/1961 | Puder | 310/211 |
| 3,157,809 | 11/1964 | Bekey | 310/211 |
| 4,127,786 | 11/1978 | Volkrodt | 310/156 |
| 4,144,469 | 3/1979 | Miyashita | 310/156 |

*Primary Examiner*—R. Skudy
*Attorney, Agent, or Firm*—Craig & Antonelli

[57] ABSTRACT

The rotor core of a synchronous motor or a synchronous generator with a permanent magnet is comprised of a multiplicity of laminated thin iron sheets each having as many segments as the poles. Slits are formed between each adjacent segment, and the magnetic reluctance of the slits is made larger than that between the rotor core and the stator core, thereby minimizing the leakage fluxes within the rotor core. Each segment is required to be prevented from being broken away by centrifugal force generated while the machine is in operation. According to the invention, adjacent segments are connected by a non-magnetic material through the slits. The non-magnetic material is fitted in the recesses formed at both sides of the slit in such a manner as to connect them with each other, each of the recesses being positioned substantially parallel to the circumference of the rotor and having a wider bottom than the opening thereof.

6 Claims, 4 Drawing Figures

ROTOR OF SYNCHRONOUS MACHINES

BACKGROUND OF THE INVENTION

This invention relates to a rotor of synchronous machines, and in particular to a reinforcement of the rotor against the centrifugal force generated in synchronous machines rotating at high speed.

The rotor core of a synchronous machine is comprised of a multiplicity of laminations of blanked iron sheets. In many cases, the blanked iron sheets have as many segments and bridging sections connecting the segments as the poles. Between adjacent segments, slits extending from a point near the inner periphery to a point near the outer periphery are provided, so that the magnetic reluctance between adjacent segments is made larger than that between the rotor core and the stator core. In other words, the slits are provided for the purpose of minimizing the leakage magnetic fluxes within the rotor core. The bridging sections are provided in order to facilitate the assembly of segments, which would be difficult in the absence of the bridging sections on the one hand, and to absorb the centrifugal force while the machine is in operation on the other hand. The bridging sections, however, are required to be easily magnetically saturated and therefore are limited in width. Thus the mere provision of the bridging sections is not sufficient if the segments are to remain coupled strongly to each other against the centrifugal force.

As a measure against the centrifugal force, the method disclosed in Japanese Patent Kokai (Laid-Open) No. 3170/71 is well known. According to such a method, a clamp of non-magnetic material is provided over different segments on the outer periphery of the rotor, and both ends of the clamp, together with damper windings, are inserted fixedly into the slots, thereby coupling the segments to each other securely. In this configuration, the clamp has a uniform thickness and the ends thereof are only bonded between the slot and the damper winding. Further, in view of the difference in the coefficient of thermal expansion between the rotor core material and the damper winding material, a temperature change may cause a gap between the slot and the damper winding. The resulting disadvantage is a reduced ability of the clamp to couple the segments, thereby leading to a lower resistance to the centrifugal force. The undesirable gap between the slot and the damper winding inevitably develops especially due to the fact that the temperature of the rotor in operation is about 100° C. higher than that of the rotor in stationary state. If a clamp with high rigidity is used, the clamp with the ends thereof bent at right angles and inserted into the slots is capable of enduring a considerable centrifugal force. However, a higher rigidity requires a considerably large thickness of the clamp.

If the thickness of the clamp is increased, the space between the stator core and the rotor core is required to be enlarged accordingly. As a result, the machine portion with the clamp has an increased magnetic reluctance, so that when the machine is operated as a motor, the AC magnetic field in acceleration cannot enter the rotor easily at the clamp. Thus a greater starting current is required and the accelerating torque is reduced. Furthermore, when the machine is operated as a generator, the output voltage contains more high harmonics. In order to minimize these disadvantages, the thickness of the clamp is limited, resulting in an unsatisfactory measure against the centrifugal force.

SUMMARY OF THE INVENTION

Accordingly, it is an object of the present invention to provide a rotor of synchronous machines which is sufficiently high in resistance to the centrifugal force.

Another object of the present invention is to provide a rotor of synchronous machines which are capable of being operated with a small starting current and satisfactory accelerating torque.

Still another object of the invention is to provide a rotor of synchronous machines which are capable of being operated as a generator with an output voltage containing a small amount of high harmonics.

The above and other objects, features and advantages will be made apparent by the detailed description taken in conjunction with the accompanying drawings.

According to the present invention, there is provided a rotor core comprising a multiplicity of laminations of blanked iron sheets. Each of the blanked iron sheets has segments in the same number as the poles and is divided by the slits extending from a point near the inner periphery towards the outer periphery. Corresponding to each segment is provided a permanent magnet of a specific polarity. The rotor core and the permanent magnets are adapted to rotate integrally with the rotary shaft. From the viewpoint of ease of assembly and endurance against centrifugal force, the segments are preferably connected by bridge sections which cross the slits and are easily saturated magnetically. The slits may extend either radially of the rotary shaft of the rotor core or somewhat spirally from the inner peripheral side towards the outer periphery. The slits may also take such a form as to extend toward the outer periphery, somewhat return towards the inner periphery, and again extend towards the outer periphery. Each of the slits may have uniform width or may have a wider part for accommodating the permanent magnet. Recesses opened in the direction substantially parallel to the circumference are formed at both sides of the slits. The recesses have a bottom wider than the opening thereof for the purpose of securely fitting a key member into the recesses across the slit. This key member is preferably made of a non-magnetic material, but may be comprised of a magnetic material if the material and size thereof are so selected that it is magnetically saturated by a small amount of magnetic fluxes. As another alternative, the key member may comprise a non-magnetic material with a wedge-shaped magnetic material welded to the sides thereof in such a manner that the part thereof crossing the slit consists of the non-magnetic material. The last-mentioned construction facilitates the passage of magnetic flux even through the recesses, thereby advantageously making uniform the magnetic flux density over the whole segments. As still another alternative, a flattened sleeve may be inserted into the recesses so that into those parts of the sleeve positioned in the recesses, pins are driven and thus the particular parts of the sleeve are enlarged, with the result that the sleeve and the pins make up a key member, thus facilitating the insertion of the key member into the recesses. The number of the key members crossing each slit and the number of the recesses for receiving the ends of the key member may be determined by the required strength. The space other than occupied by the key member in the slits may be filled with such a non-magnetic material as aluminum, so that the key member is hard to move in the slit and therefore is strengthened.

According to the above-mentioned construction of the present invention, the centrifugal force exerted on the rotor core is absorbed into the key member. Also, in view of the fact that the key member is securely fitted in the recess with a bottom wider than the opening thereof, the segments are strongly coupled to each other and thus prevented from being separated from each other even under a considerably large centrifugal force.

Furthermore, the key member is located inwardly of the outer periphery of the rotor core where the magnetic characteristics are hardly affected, thus making it possible to provide a uniform air gap between the rotor core and the stator core over the entire periphery. The result is only a small starting current is required and sufficient accelerating torque is provided when the machine is operated as a motor, while an output voltage with few high harmonics is obtained when the machine is operated as a generator. In addition, the present invention is applicable to a machine without any damper winding like the generator.

DESCRIPTION OF THE PREFERRED EMBODIMENTS

Figure 1:
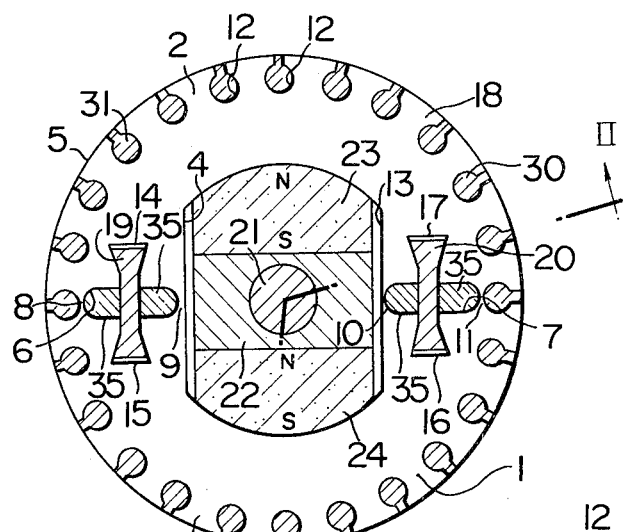
FIG. 1 is a diagram showing a section in a plane perpendicular to the axis of a two-pole rotor of a synchronous machine according to an embodiment of the present invention.
Figure 2:
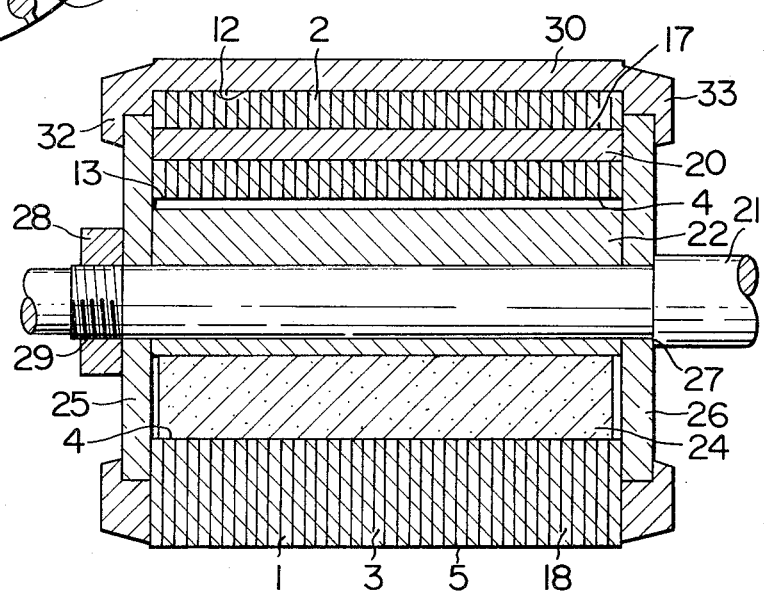
FIG. 2 is a sectional view taken along the line II—II in FIG. 1.

In FIGS. 1 and 2, reference numeral 1 shows blanked iron sheets each having segments in the same number as the poles. In the embodiment shown, the machine has two poles and therefore each sheet has two segments 2, 3. Between the segments 2 and 3, two slits 6 and 7 extending from a point near the inner periphery 4 towards the outer periphery 5 are formed. Generally, the two segments 2 and 3 are connected integrally by bridges 8, 9, 10 and 11. The width of the bridges 8, 9, 10 and 11 is sufficiently large to prevent the segments 2 and 3 from being separated from each other before being assembled for the purpose of facilitating the assembly work, but sufficiently narrow to facilitate magnetic saturation for the purpose of minimizing the leakage of magnetic flux between the segments. The blanked iron sheets 1 have a multiplicity of slots 12 in the neighbourhood of the periphery thereof and a center hole 13 at the central part thereof. The blanked iron sheet 1 has the slits 6 and 7 which in turn have recesses 14, 15, 16 and 17 formed at both sides substantially parallel to the circumference of the iron sheet. Each of the recesses 14, 15, 16 and 17 has a bottom wider than the opening thereof. A multiplicity of the blanked iron sheets with such a construction are laminated in such a manner that the center holes 13, the slots 12, the slits 6 and 7, and the recesses 14, 15, 16 and 17 of all the sheets are arranged in registration at the same positions respectively, thus making up a rotor core 18. Across the slits 6 and 7, key members 19 and 20 of non-magnetic materials such as stainless steel are mounted with the ends thereof securely fitted into the recesses 14, 15, 16 and 17 respectively. A rotary shaft 21 is arranged in the center hole 13 concentrically with the rotor core 18. A boss 22 with a rectangular section is fitted over the rotary shaft 21 in such a manner prohibiting relative motion thereof with the rotary shaft. Permanent magnets 23 and 24 are inserted between the opposed sides of the boss 22 and the rotor core 18 respectively. The two permanent magnets 23 and 24 are arranged in such a manner as to be connected in the direction perpendicular to the longitudinal direction of the slits 6 and 7. The permanent magnet 23 is arranged with the N pole thereof directed outward and the permanent magnet 24 with the S pole thereof directed outward; In other words, the segment 2 exhibits the polarity N and the segment 3 the polarity S the segments being of magnetic material as parts of blanked iron sheets 1. Support discs 25 and 26 are provided to hold the rotor core 18 at the longitudinal sides thereof. The support discs 25 and 26 are securely fitted on the rotary shaft 21 and, through the step 27 formed on the rotary shaft 21 and the fastening nut 28, press the rotor core 18 inwardly from both sides thereof. The support disc 26 is fitted before the boss 22 on the rotary shaft 21. The fastening nut 28 is screwed on the thread 29 cut on the rotary shaft 21. Conductors 31 are formed in the slots 12 by die casting. A squirrel-cage winding is comprised of conductors 31 cast in the slots 12, and end rings 32 and 33 for electrically connecting all the conductors 31 on both sides of the rotor core 18. The squirrel-cage winding 30 may be caused to act as a starting winding when the rotor is used as a motor; and to act as damper winding after the rotor has been started. The squirrel-cage winding 30 fails to function and therefore the slots 12 are not required when the rotor is used as a generator.

Figure 3:
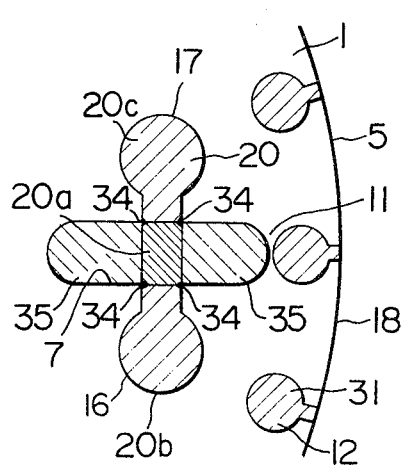
FIGS. 3 and 4 are diagrams showing part of a section in a plane perpendicular to the axis of the rotor of a synchronous machine according to other embodiments of the present invention.

The key member 20 shown in FIG. 3 is comprised of a non-magnetic material 20a such as stainless steel on both sides of which magnetic materials 20b and 20c are welded at points 34 substantially parallel with the circumference of the iron sheet. In other words, the part 20a of the key member 20 which crosses the slit 7 is made of stainless steel, and the parts 20b and 20c thereof inserted into the recesses 16 and 17 of iron.

Figure 4:
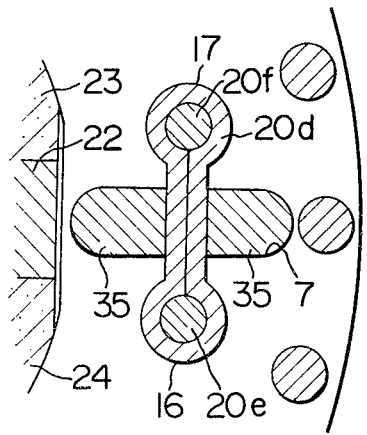

In the embodiment shown in FIG. 4, the ends of the sleeve 20d of non-magnetic material in the form of a flattened cylinder are inserted into the recesses 16 and 17 across the slit 7, and then the pins 20e and 20f of magnetic material are pressed into the sleeve 20d in the recesses 16 and 17. The recesses 16 and 17 shown in FIGS. 3 and 4 are substantially circular, and the slots 12 shown in FIG. 4 are of the enclosed type.

In each of the above-mentioned embodiments, the space in the slits 6 and 7 remaining after the key members 19 and 20 are pressed in are filled with aluminum 35.

We claim:
1. A rotor of synchronous machines comprising:
a rotor core including a multiplicity of laminations of blanked iron sheets each having segments divided by a plurality of slits, said segments corresponding in number to the number of poles, each of said blanked iron sheets having a center hole, and said laminations being made in such a manner that said holes and said slits of all of said blanked iron sheets are arranged in alignment at the same positions;
a plurality of permanent magnets which are received by said center holes of said blanked iron sheets so as to provide each pole constituted by said seg- ments of said blanked iron sheets with a specific polarity;

a rotary shaft arranged in said center holes concentrically with said rotor core and adapted to rotate integrally with said rotor core and said permanent magnets;

a plurality of recesses formed in both sides of each of said slits and having a bottom wider than the opening; and a plurality of key members with the ends thereof securely fitted with said recesses across said slits respectively.

2. A rotor of synchronous machines according to claim 1, in which said key members are made of a non-magnetic material.

3. A rotor of synchronous machines according to claim 1, in which said laminations of said blanked iron sheets each with adjacent segments connected by a plurality of bridges magnetically saturated with a small amount of magnetic flux make up said rotor core.

4. A rotor of synchronous machines according to claim 1, in which each of said key members includes part of non-magnetic material crossing each of said slits and parts of magnetic material integrated with said part of non-magnetic material and inserted into said recesses.

5. A rotor of synchronous machines comprising:

a rotor core including a multiplicity of laminations of blanked iron sheets each having segments divided by a plurality of slits, said segments corresponding in number to the number of poles, each of said blanked iron sheets having a center hole, and said laminations being made in such a manner that said holes and said slits of all of said blanked iron sheets are arranged in alignment at the same positions;

a plurality of permanent magnets which are received by said center holes of said blanked iron sheets so as to provide each pole constituted by said segments of said blanked iron sheets with a specific polarity;

a rotary shaft arranged in said center holes concentrically with said rotor core and adapted to rotate integrally with said rotor core and said permanent magnets;

a plurality of recesses formed in both sides of each of said slits and having a bottom wider than the opening;

a plurality of flattened sleeves each with the ends thereof inserted into each of said recesses across each of said slits; and a plurality of pins each inserted in the part of each of said sleeves positioned within each of said recesses so as to anchor said sleeves fast to said recesses.

6. A rotor of bipolar synchronous machines comprising:

a rotor core including a multiplicity of laminations of blanked iron sheets each having two segments divided by two slits, each of said blanked iron sheets having a center hole, and said laminations being made in such a manner that said holes and said slits of all of said blanked iron sheets are arranged in alignment at the same positions;

a plurality of permanent magnets which are received by said center holes of said blanked iron sheets so as to provide one pole constituted by one of said segments of each of said blanked iron sheets with the polarity N and the other pole constituted by the other of said segments of each of said blanked iron sheets with the polarity S;

a rotary shaft arranged in said center holes concentrically with said rotor core and adapted to rotate integrally with said rotor core and said permanent magnets;

a plurality of recesses formed in both sides of each of said slits and having a bottom wider than the opening; and a plurality of key members with the ends thereof securely fitted into said recesses across said slits respectively.

* * * * *